United States Patent Office 3,732,201
Patented May 8, 1973

3,732,201
3-CHLORO - 1,2,4 - THIADIAZOLYL-5 AND 3-CHLORO - 1,2,4 - THIADIAZOLIUM-5 AZO DYESTUFFS
Visvanathan Ramanathan, Basel, Switzerland, assignor to Ciba-Geigy AG
No Drawing. Filed Feb. 16, 1970, Ser. No. 11,888
Claims priority, application Switzerland, Feb. 19, 1969, 2,509/69
Int. Cl. C29b 29/10, 29/36, 29/38
U.S. Cl. 260—153    11 Claims

ABSTRACT OF THE DISCLOSURE

A dyestuff of the formula

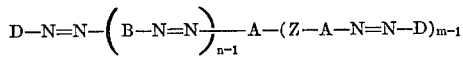

in which D is quaternated or unquaternated 3-halogeno-1,2,4-thiadiazolyl-5-, $n$ is 1 or 2, $m$ is 1 or 2, $n$ and $m$ together are 2 or 3, Z is a single bond, an oxygen or sulfur atom, an imido or sulfonyl group, or a divalent organic residue, B is a 1,4-phenylene residue that may be substituted, and A is the residue of a coupling component, D, B, A and Z being free from sulfonic acid groups.

---

The present invention provides valuable azo dyestuffs that contain at least one quaternated or unquaternated 3-halogeno-1,2,4-thia-diazolyl-5-azo group.

The present invention also provides a process for preparing the above-mentioned dyestuffs, wherein a compound that contains at least one residue capable of acting as a coupling component is coupled with a diazotised 3-halogeno-1,2,4-thiadiazolyl-5-amine and then, if appropriate, quaternated. The coupling component may be a diazotisable compound, which may be diazotised and coupled with a further coupling component.

Preferred dyestuffs are those of the general formula

D—N=N—A, especially those which are free from acid groups imparting solubility in water, in which D represents a 3-halogeno-1,2,4-thiadiazole or -thiazolium residue especially a 3-bromo- or chloro-1,2,4-thiadiazole or -thiazolium residue and A represents the residue of a coupling component bound directly or through an azophenylene residue, A being especially a residue of a phenol, a naphthol, a pyrazolone, a pyridone, an aminopyrazole, an enolisable keto compound or an aniline, especially an alkylaniline.

The dyestuff may be further defined as an azo dyestuff of the formula

D—N=N—A wherein D is 3-chloro-1,2,4-thiadiazolyl-5 or 3-chloro-1,2,4-thiadiazolium-5 and where A is the radical of a coupling component bound to the azo group via a carbon atom and selected from the group consisting of hydroxybenzene, hydroxybenzene substituted by lower alkyl-, lower alkoxy-, chloro-, lower alkylamino-, lower dialkylamino- or alkanoylamino containing up to 8 carbon atoms, hydroxynaphthalene, indole or indole substituted by lower alkyl-, lower alkoxy-, chloro-, cyano-, nitro- or phenyl-, 5-hydroxypyrazolone, 5-aminopyrazolone or said 5-hydroxypyrazolone or 5-aminopyrazolone substituted by lower alkyl-, phenyl-, carboxy-, carbonamido- or carbloweralkoxy-, 4-hydroxyquinoline-2, or 4-hydroxyquinoline-2 substituted by lower alkyl-, lower alkoxy- or chloro-, tetrahydroquinoline or tetrahydroquinoline substituted by lower alkyl-, lower alkoxy-, lower cyanalkyl- or lower alkanoyloxy, malonic dinitrile, 2-hydroxy - 4 - methyl-5-cyano-6-pyridone, acetylacetone, dimedone, the term lower meaning that the radical contains at most 4 carbon atoms.

Further preferred dyestuffs are those of the general formula (D—N=N—A'—)$_2$Z in which D has the meaning defined above, A' represents the residue of a doubly bound coupling component and Z represents a simple bond, an oxygen or a sulphur atom or an imido or sulphonyl group or a divalent organic residue containing no groups having dyestuff characteristics as well as the dyestuffs of the general formula

D—N=N—A"—N=N—A in which D and A have the meanings defined above and A" represents an unsubstituted or substituted phenylene residue.

These compounds may be further defined as those of the formula

where D is 3-chloro-1,2,4-thiadiazolyl-5 or 3-chloro-1,2,4-thiadiazolium-5; $e$ is H, CH$_3$, OCH$_3$ or Cl; $f$ is H or OCH$_3$; A is hydroxybenzene, hydroxybenzene substituted by lower alkyl, lower alkoxy, chloro, lower alkylamino, lower dialkylamino or C$_{1-8}$-alkanoylamino; 5-hydroxypyrazole, 5-aminopyrazole or said 5-hydroxypyrazole and 5-aminopyrazole substituted by lower alkyl, phenyl, carboxy, carbonamido or carbloweralkoxy or aminobenzene of the formula

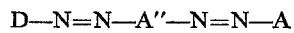

in which $d$ is hydrogen, chlorine, bromine, lower alkyl, lower alkoxy, C$_1$-C$_2$-alkylmercapto, phenyl, phenylmercapto, phenoxy, cyclohexyl or benzyl; $c$ is hydrogen, chlorine, bromine, lower alkyl, lower alkoxy, C$_1$-C$_2$-alkylmercapto, phenyl, phenylmercapto, phenoxy, cyclohexyl, benzyl, trifluoromethyl, C$_1$-C$_2$-alkyl sulphonamido or C$_{1-8}$-alkanoylamino, C$_1$-C$_2$-alkylsulphonic acid, p-toluene sulphonic acid, phenoxycarbonyl, C$_1$-C$_2$-alkoxycarbonyl, ethoxycarbonylamino or aminocarbonyl; R$_1$ and R$_2$ each independently is hydrogen, lower alkyl, or lower alkyl substituted by benzyl, phenyl, chloro, cyano, (C$_1$-C$_2$) alkoxy, glycidyl, hydroxy, nitro, carb(lower)alkoxy, formylamino, acetylamino, (lower)alkylcarbonyloxy, β-phenylsulphonyl, β-toluenesulphonyl, β-p-chlorobenzenesulphonyl, β-methylcarbamyloxy, β-phenylcarbamyloxy, (lower)alkyloxycarbonyloxy, acetamidopropyl, nitrophenoxy, hydroxyphenoxy, (acetyl, cyano, hydroxy, methoxy or acetoxy)ethoxycarbonyl, cyanoethoxy, carboxy, acetyl, amino, diethylamino β-cyanoacetoxy, β-benzoyl-β-benzoyl-β-hydroxy, benzoyloxy, phthaloylimido, 2-methyl-5-pyridyl, phenoxy, 4-methoxycarbonylbenzoyloxy, anisoyloxy, 2-chlorobenzoyloxy, phenylsulphonyloxy, phenoxyacetoxy, phenylthio, nicotinyloxy, 2-thiophenecarbonyl, methoxyacetoxy, phenylacetoxy or furoyloxy.

Specially preferred monoazo dyestuffs are those of the general formula

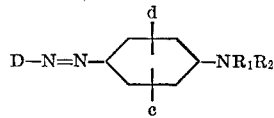

in which $d$ represents a hydrogen or halogen atom, a lower alkyl, alkoxy or mercapto group, an aryl, arylmercapto, or aryloxy group or a cycloalkyl, cycloalkylmethyl or benzyl residue, $c$ has the same meaning as $d$ or represents an acylamino group, and $R_1$ and $R_2$ each represents a hydrogen atom or a unsubstituted or substituted alkyl group, especially the monoazo dyestuffs of the general formula

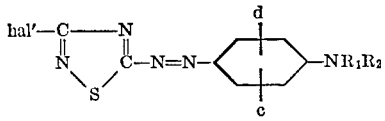

in which "hal'" represents a bromine atom or preferably a chlorine atom and $R_1$, $R_2$, $c$ and $d$ have the meanings given above and more especially the dyestuffs of the general formula

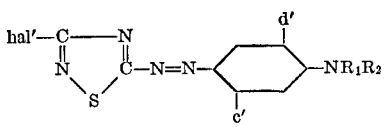

in which "hal'," $R_1$ and $R_2$ have the meanings defined above and $c'$ and $d'$ each represents a hydrogen atom, methyl, ethyl, methoxy, ethoxy, phenylthio or phenoxy residue.

The groups may be further defined as follows: D is 3-chloro-1,2,4-thiadiazolyl-5 or 3 - chloro-1,2,4-thiadiazolium-5; $d$ is hydrogen, chloride, bromine, lower alkyl, lower alkoxy, $C_1$–$C_2$-alkylmercapto, phenyl phenylmercapto, phenoxy, cyclohexyl or benzyl; $c$ is hydrogen, chlorine, bromine, lower alkyl, lower alkoxy, $C_1$–$C_2$-alkylmercapto, phenyl, phenylmercapto, phenoxy, cyclohexyl, benzyl, trifluoromethyl, $C_1$–$C_2$-alkylsulphonamido or $C_{1-8}$-alkanoylamino, $C_1$–$C_2$-alkylsulphonic acid, p-toluene sulphonic acid, phenoxycarbonyl, $C_1$–$C_2$-alkoxycarbonyl, ethoxycarbonylamino or aminocarbonyl; $R_1$ and $R_2$ each independently is hydrogen, lower alkyl or lower alkyl substituted by benzyl, phenyl, chloro, cyano, ($C_1$–$C_2$) alkoxy, glycidyl, hydroxy, nitro, carb(lower)alkoxy, formylamino, acetylamino, (lower)alkylcarbonyloxy, β-phenylsulphonyl, β-toluenesulphonyl, β-p-chlorobenzenesulphonyl, β-methylcarbamyloxy, β-phenylcarbamyloxy, (lower)alkyloxycarbonyloxy, acetamidopropyl, nitrophenoxy, hydroxyphenoxy, (acetyl, cyano, hydroxy, methoxy or acetoxy)ethoxycarbonyl, cyanoethoxy, carboxy, acetyl, amino, diethylamino, β-cyanoacetoxy, β-benzoyl-β-hydroxy, benzoyloxy, phthaloylimido, 2-methyl-5-pyridyl, phenoxy, 4-methoxycarbonylbenzoyloxy, anisoyloxy, 2-chlorobenzoyloxy, phenylsulphonyloxy, phenoxyacetoxy, phenythio, nicotinyloxy, 2-thiophenecarbonyl, methoxyacetoxy, phenylacetoxy or furolyoxy.

Apart from the groups mentioned above $c'$ may also represent a chlorine or bromine atom, a trifluoromethyl group or an acylamino group, which may be alkylated (preferably methylated) on the nitrogen atom, in which the acyl residue is the residue of an organic monocarboxylic acid, of an organic monosulphonic acid, for example, methanesulphonic, ethane-sulphonic or para-toluene monosulphonic acid, or the residue of a carbamic acid or of a carbonic acid monoester or monamide such as phenoxycarbonyl, methoxycarbonyl or aminocarbonyl.

The groups $R_1$ and $R_2$ may each represent a hydrogen atom or a lower alkyl group (that is to say one which contains 1 to 4, preferably 2 to 4 carbon atoms), for example, a methyl, ethyl, n-propyl or n-butyl group, which may be substituted in the usual manner, for example benzyl, β-phenethyl, halogenated alkyl groups, for example, β - chlorethyl, β,β,β - trifluorethyl, β,γ - dichloropropyl, β-cyanoethyl, alkoxyalkyl, for example, β-ethoxyethyl or δ-methoxybutyl, glycidyl, hydroxyalkyl, for example, β-hydroxyethyl, β,γ-dihydroxypropyl, nitroalkyl, for example, β-nitroethyl, carbalkoxy, for example, β-carbo(methoxy-, ethoxy- or propoxy-)ethyl [in which the terminal alkyl group may contain cyano, carbalkoxy, acyloxy or amino groups in the ω-position], β- or γ-carbo (methoxy- or ethoxy)propyl, acylaminoalkyl such as β- (acetyl- or formyl-) aminoethyl, acyloxyalkyl, for example, β-acetyloxyethyl, β,γ-diacetoxypropyl, γ-butyryloxypropyl, β-arylsulphonylalkyl, for example, β-phenylsulphonylethyl, β-toluenesulphonylethyl, β-(p-chlorobenzenesulphonyl)-ethyl, alkyl- or arylcarbamyloxyalkyl, for example, β-methylcarbamyloxyethyl and β-phenylcarbamyloxyethyl, alkyloxycarbonyloxyalkyl, for example, β-(methoxy-, ethoxy- or isopropoxy-)carbonyloxyethyl, γ-acetamidopropyl, β - (p-nitrophenoxy)ethyl, β - (p-hydroxyphenoxy)-ethyl, β-(β'-acetylethoxycarbonyl)-ethyl, β-[(β'(-cyano-, hydroxy-, methoxy- or acetoxy-)-ethoxycarbonyl]-ethyl, cyanoalkoxyalkyl, β-carboxyethyl, β-acetylethyl, γ-aminopropyl, β-diethylaminoethyl, β-cyanoacetoxyethyl, β-benzoyl-β- and (p-alkoxy- or phenoxybenzoyl)-hydroxy-ethyl groups.

Preferably the groups $R_1$ and $R_2$ contain not more than 18 carbon atoms.

The azo dyestuffs may be prepared with the use of any desired coupling components, for example those of the benzene or naphthalene series or of the series of the heterocyclic coupling components. From among the coupling components of the benzene series there may be mentioned as well as the phenols, for example, m- or p-cresol, resorcinol, 1-hydroxy-3-cyanomethylbenzene, especially the aminobenzenes, for example aniline, 3-methylaniline, 2-methoxy-5-methylaniline, 3-acetylamino-1-aminobenzene, N-methylaniline, N-β-hydroxyethylaniline, N-β-methoxyethylaniline, N-β-cyanoethylaniline, N-β-chlorethylaniline, dimethylaniline, diethylaniline, N-methyl-N-(benzyl- or β-phenylethyl)-aniline, N-n-butyl-N-β-chlorethylaniline, N-methyl-, ethyl, propyl, or butyl-)-N-β-cyanoethylaniline, N - methyl-N-β-hydroxyethylaniline, N - ethyl-N-β-chlorethylaniline, N-methyl-N-β-acetoxyethylaniline, N-ethyl-N-β-methoxyethylaniline, N-β-cyanoethyl-N-β-chlorethylaniline, N-cyanoethyl-N-(acetoxy- or benzoyloxyethyl) aniline, N,N-di-α-hydroxyethylaniline, N,N-di-β-acetoxyethylaniline, N - ethyl-N,2-hydroxy-3-chloropropylaniline, N,N - di - β - cyanoethylaniline, N,N-di-β-cyanoethyl-3-methylaniline, N - β' - cyanoethyl-N-β''-hydroxyethyl-3-chloraniline, N,N-di-β-cyanoethyl-3-methoxyaniline, N,N-dimethyl-3-acetylaminoaniline, N-ethyl-N-β-cyanoethyl-3-acetylaminoaniline, N,N-di-β-cyanoethyl - 2 - methoxy-5-acetylaminoaniline, N-methyl - N - phenacylaniline, N-β-cyanoethyl-2-chloraniline, N,N-di-ethyl-3-trifluoromethylaniline, N - ethyl - N - phenylaniline, diphenylamine, N-methyldiphenylamine, N - methyl-4-ethoxydiphenylamine or N-phenylmorpholine; furthermore, for example, amines of the formula

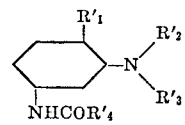

in which $R'_1$ represents a hydrogen atom or an alkyl or alkoxy group, $R'_2$ a cyanoalkoxyalkyl group, $R'_3$ a hydrogen atom or a cyanoalkoxyalkyl or acyloxyalkyl group and $R'_4$ represents a hydrogen atom, a possibly substituted alkyl, cycloalkyl or alkoxy group or for a benzene residue, and especially those of the formula

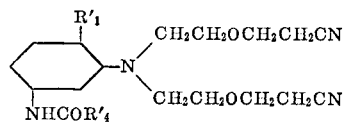

in which $R'_1$ and $R'_4$ have the meanings defined above.

Equally valuable results are obtained with a coupling component of the formula

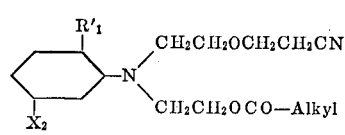

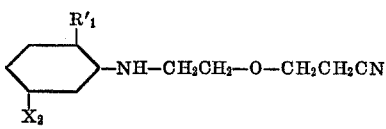

in which $R'_1$ has the meaning defined above and $X_2$ represents an acylamino group, and in which alkyl may stand, for example, for a methyl, ethyl or propyl group.

As relevant examples the following coupling components may be mentioned:

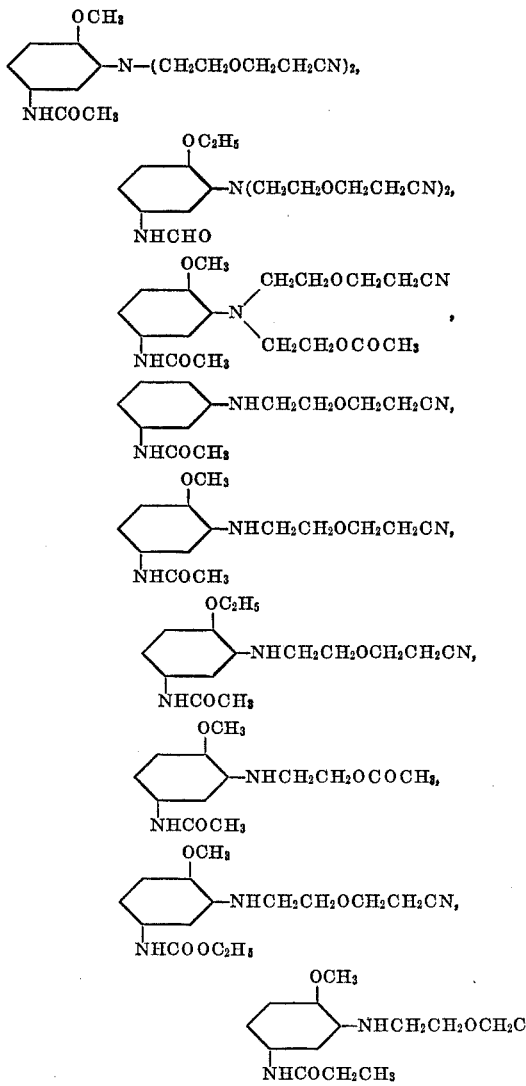

From the series of the coupling components of the naphthalene series there may be mentioned, apart from the naphthols, for example: 1- or 2-naphthylamine as well as 2-phenylaminonaphthalene, 1-dimethylaminonaphthalene or 2-ethylaminonaphthalene. From the series of the heterocyclic coupling components there may be mentioned, for example, the indoles, for example, 2-methylindole, 2,5-dimethylindole, 2,4-dimethyl-7-methoxyindole, 2-phenyl- or 2-methyl-5-ethoxyindole, N,β-cyanoethyl-2-methylindole, 2-methyl-5- or -6-chlorindole, 1,2-dimethylindole, 1-methyl-2-phenylindole, 2-methyl-5-nitroindole, 2-methyl-5-cyanoindole, 2-methyl-7-chlorindole, 2-methyl-5-fluor- or -5-bromindole, 2-methyl-5,7-dichlorindole or 2-phenylindole, 1-cyanoethyl-2,6-dimethylindole; pyridines such as 3-cyano-2,6-dihydroxy-4-methyl-pyridine; furthermore pyrazoles, for example 1-phenyl-5-aminopyrazole or 3-methylpyrazolone(5) or 1-phenyl-3-methylpyrazolone(5), 1,3-dimethyl-pyrazolone(5), 1-butyl-3-methylpyrazolone(5), 1-hydroxyethyl-3-methyl-pyrazolone(5), 1-cyanoethyl-3-methyl-pyrazolone(5), 1- (o-chloro-phenyl)-3-methylpyrazolone(5), 3 - carbomethoxy-pyrazolone(5); quinolines, for example, 8-hydroxyquinoline, 1-methyl-4-hydroxyquinolone-(2), N-ethyl-3-oxy-7-methyl- or N-β-cyanoethyl-1,2,3,4-tetrahydroquinoline or pyrimidines, for example, barbituric acid, as well as 1,3-indandione, 1,8-naphthindandione, dimedone, acetoacetic acid anilide, m-hydroxy-N,N-diethylaniline, 3-hydroxy-4'-methyldiphenylamine, hydroquinone - monomethyl ether, acetylacetone, 5-hydroxybenzthiazole and 1,2-diphenyl-pyrazoline-3,5-dione.

Suitable fibre-reactive coupling components include, for example, 2,4-dichloro-6-[γ(N-m-tolyl-N-ethylamino) propyl]-amino-1,3,5-triazine, N,N-di(γ-chloro-β-hydroxypropyl)-m-toluidine, 3-chloreacetylamino-N,N-dihydroxyethylaniline, 1 - [3'-(β,p-benzenesulphonyloxyethylaminosulphonyl)phenyl]-3-methyl-5-pyrazolones and N,N-di (2,3-epoxypropylanilines). Further fibre-reactive coupling components have been mentioned in British patent specification No. 901,434, column 2, lines 66 to 125.

Further suitable coupling components include those which contain a quaternable or quaternated group, for example N-methyl-N,2-dimethylaminoethylaniline, N,2-(N'-ethyl - N' - phenyl)-aminoethyl-pyridinium chloride; furthermore, for example, compounds of the formulae

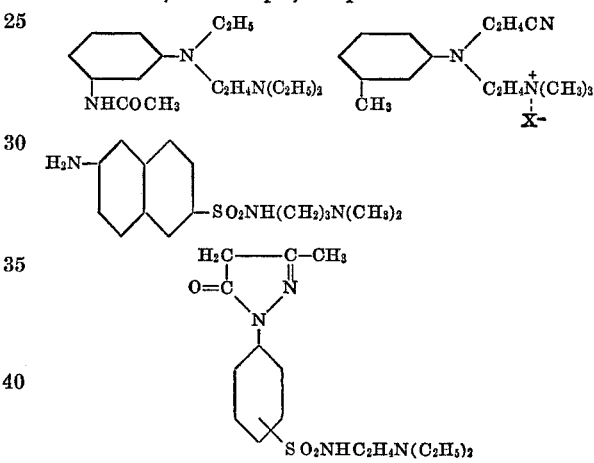

Further suitable coupling components are diazotisable amines, for example 1-amino-3-methylbenzene, 1-amino-2-methoxy-5-methylbenzene and 1-aminonaphthalene, so that aminoazo dyestuffs are obtained which themselves can be diazotised and coupled with the above-mentioned coupling components to form dis- or polyazo dyestuffs.

Finally, there may also be used bifunctional coupling components, for example those of the formulae

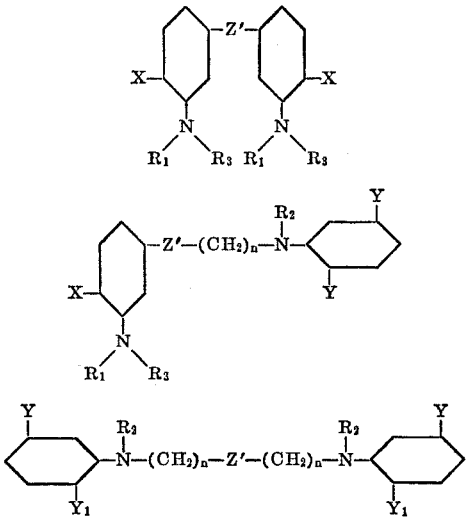

in which X, Y and $Y_1$ each represents a hydrogen atom or a trifluoromethyl, alkanesulphonyl, alkyl, alkoxy, aryloxy, arylthio or acylamino group or a halogen atom, $R_1$, $R_2$ and $R_3$ each represents a hydrogen atom or an unsubstituted or substituted alkyl group, $n=1$, 2 or 3 and $Z'$ represents a bridge member of the formula $$-X'-(B-Y')_{p-1}-(R')_{q-1}-(Y'-B)_{r-1}-X'-$$

in which B represents a CO—, $SO_2$— or lower alkylene bridge, $X'$ and $Y'$ each represents an oxygen or a sulphur atom or a nitrogen bridge, especially an —NH— bridge, or a direct bond and the two $X'$ and $Y'$ and B may be different from each other; $R'$ represents a substituted or unsubstituted heterocyclic, aromatic or possibly by hetero atoms interrupted aliphatic residue, and $p$, $q$ and $r$ each is 1 or 2, but $p+q+r$ must be at least 4. Examples of such coupling components, on both sides of which a diazotised amine may be coupled, are:

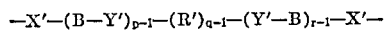

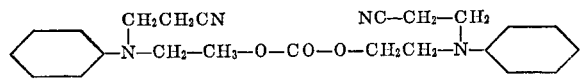

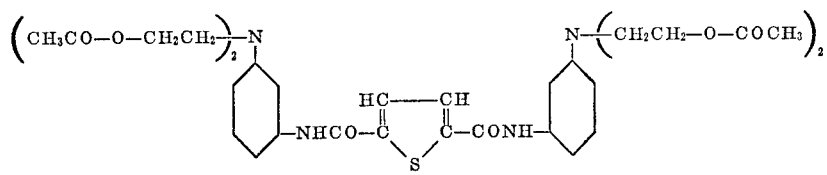

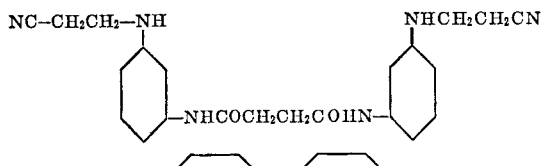

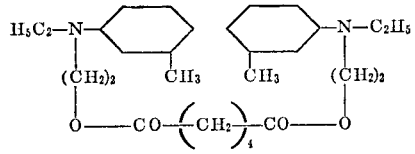

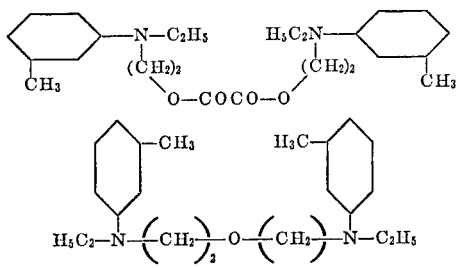

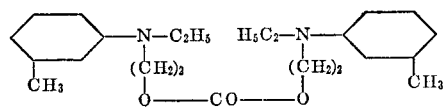

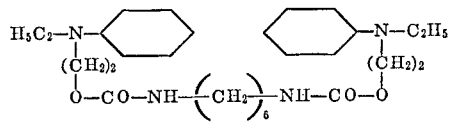

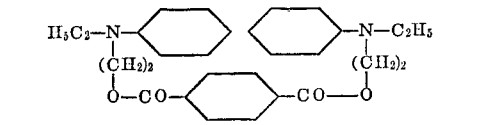

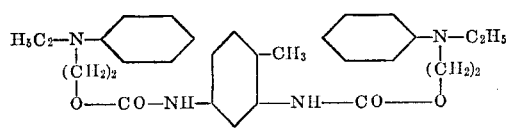

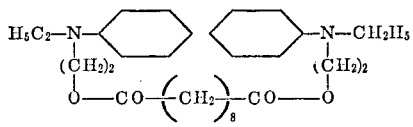

Instead of a unitary diazo component there may be used a mixture of two or more of the diazo components according to this invention and instead of a unitary coupling component a mixture of two or more of the coupling components according to this invention.

The coupling components used in the present dyestuffs may also be divided into anilines, phenols, naphthols and compounds containing an active methylene group as defined, for example, in the textbook "The Aromatic Diazo Compounds" by K. H. Saunders, London, 1949, page 209.

The 3-halogeno-5-amino-1,2,4-thiadiazoles, especially the chloro derivative, have been described in Berichte, volume 93, page 2197 [1960].

The diazotisation of the afore-mentioned diazo components may be carried out, for example, with the aid of concentrated phosphoric acid and sodium nitrite or, for example, with a solution of nitrosylsulphuric acid in concentrated sulphuric acid.

The coupling may also be carried out by a method known per se, for example in a neutral to acid medium, if desired in the presence of sodium acetate or a similar buffer substance capable of influencing the coupling speed, or of a catalyst, for example dimethylformamide or pyridine or a pyridine salt.

However, rapid, possibly continuous mixing within a small space may be achieved, if desired, with other devices.

Owing to the nitrogen atom in the thiadiazole ring and also when the residue A contains a quaternable nitrogen atom, for example a pyridine group, the dyestuffs can be quaternated, and this is preferably done as the last process step.

The quaternization may be carried out by treatment with an ester of a strong mineral acid or organic sulphonic acid, for example with dimethyl sulphate, diethyl sulphate, an alkyl halide, for example, methyl-chloride, -bromide or-iodide, an aralkyl halide, for example, benzyl chloride, an ester of a lower alkanesulphonic acid, for example the methyl ester of methane-, ethane- or butanesulphonic acid or the alkyl esters of (4-methyl-, 4-chloro- or 3- or 4-nitro)-benzenesulphonic acid that form as anions halogen, sulphuric acid semiesters, alkanesulphonic or benzenesulphonic acid anions, preferably at an elevated temperature in an inert organic solvent, for example in xylene, carbon tetrachloride, ortho-dichlorobenzene or nitrobenzene. Further suitable solvents include acetic anhydride, dimethylformamide, acetonitrile or dimethyl sulphoxide. The quaternated dyestuffs contain as anion $Y^-$ preferably the residue of a string acid, for example, sulphuric acid or its semiesters, or a halide ion, but they may also be used as double salts, for example with zinc chloride, or in the form of free bases.

The new water-insoluble dyestuffs, mixtures of these dyestuffs and mixtures thereof with other azo dyestuffs are very suitable for dyeing or printing leather, wool, silk and especially synthetic fibres, for example acrylic or acrylonitrile fibres, of polyacrylonitrile or copolymers of acrylonitrile with other vinyl compounds such as acrylic esters, acrylamides, vinylpyridine, vinylchloride or vinylidenechloride, or of copolymers of dicyanoethylene with vinyl acetate, or of acrylonitrile block polymers, fibres of polyurethanes, polypropylene fibres, especially polypropylene fibres modified with metals, especially with nickel, for example, cellulose triacetate and 2½-acetate and especially fibres of polyamides, for example, nylon-6, nylon-6,6 or nylon-12 and of aromatic polyesters, for example of terephthalic acid and ethyleneglycol or 1,4-dimethylcyclohexane, and copolymers of terephthalic or isophthalic acid and ethyleneglycol.

Accordingly, the present invention includes also a process for dyeing or printing textile materials based on synthetic fibres, especially polyester fibres and polypropylene fibres modified with metal compounds or, when the dyestuffs are quaternated, on acrylic fibres, wherein a dyestuff of the formula

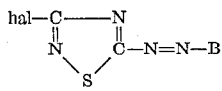

which is free from acid groups imparting solubility in water is used, in which hal represents a halogen atom, preferably a chlorine atom, and B stands for the residue of a coupling component that is free from acid groups imparting solubility in water.

For dyeing in an aqueous dyebath the water-insoluble dyestuffs are advantageously used in a finely divided form, dyeing being carried out in the presence of a dispersant, for example, cellulose sulphite waste liquor or of a synthetic detergent, or of a combination of different wetting and dispersing agents. As a rule it is advantageous to convert the dyestuffs prior to dyeing into a dyestuff preparation that contains a dispersant and the finely divided dyestuff in such a form that when the dyestuff preparation is diluted with water a fine dispersion is obtained. Such dyestuff preparations can be manufactured by a method known per se for example by grinding the dyestuff of the dry or wet form with or without addition of a dispersant during the grinding operation.

When strong dyeings are to be produced on polyethylene terephthalate it is advantageous to add to the dyebath a swelling agent, or to carry out the dyeing process under superatmospheric pressure at a temperature above 100° C., for example at 120° C. Suitable swelling agents are aromatic carboxylic acids, for example salicyclic acid, phenols, for example, o-dichlorobenzene or diphenyl.

For thermosetting the dyestuff the padded polyester fabric is advantageously heated to a temperature above 100° C., for example a temperature ranging from 180 to 210° C., advantageously after first having been dried, for example in a current of warm air.

The dyeings obtained according to the present process may be subjected to an after-treatment, for example by heating with an aqueous solution of a nonionic detergent.

Besides impregnation methods, the dyestuffs indicated above may be applied according to the process of the invention by printing, using, for example a printing paste which contains apart from the auxiliaries conventionally used in the printshop such as wetting and thickening agents, the finely divided dyestuff.

By the process of the present invention strong dyeings and prints having good fastness properties are obtained.

The new water-insoluble dyestuffs may also be used for spin-dyeing polyamides, polyesters and polyolefins. The polymer to be dyed, advantageously in the form of powders, granules or chips, is mixed, as a spinning solution ready for use or in the form of a melt, with the dyestuff, which is introduced in the dry form of a dispersion or solution in a solvent, which may be a volatile one. After having homogeneously dispersed the dyestuff in the solution or melt of the polymer, the mixture is processed by a method known per se by casting, moulding or extrusion to furnish, for example, fibres, yarns, monofils and films.

The new dyestuffs are also specially suitable for dyeing metal-modified polyolefin fibres, especially nickel-modified polypropylene fibres, more especially when the coupling component contains a hydroxyl group in o-position to the azo group.

The quaternated dyestuffs obtained according to the present process contain as anion preferably the residue of a strong acid, for example of sulphuric acid, or of a semi-ester thereof, or of an arylsulphonic acid or a halogen ion. The anions introduced into the dyestuff molecule according to the process of this invention may, if desired, be replaced by anions of other inorganic acids, for example of phosphoric acid, sulphonic acid, or of organic acids, for example of formic, lactic or tartaric acid; in certain cases the free bases may be used instead. The dyestuff salts may also be in form of double salts, for example with halides of the elements of the second group of the Periodic Table, especially zinc chloride or cadmium chloride.

The quaternated dyestuffs and dyestuff salts obtained according to this invention may be used for dyeing or printing a wide variety of fully synthetic fibres, for example polyvinylchloride, fibres, polyamide fibres, polyurethane fibres, basically modified polypropylene fibres, basically modified polyester fibres and more especially polyacrylonitrile fibres.

The quaternated, water-soluble dyestuffs are in general only slightly electrolyte-sensitive and some of them are very readily soluble in water or in polar solvents. Dyeing with the quaternated, water-soluble dyestuffs is in general carried out in an aqueous neutral or acid bath, at the boil under atmospheric pressure, or at an elevated temperature under superatmospheric pressure. The commercial levelling agents may be used.

The invention is illustrated by the following examples. Unless otherwise indicated, parts and percentages in the following examples are by weight and temperatures are shown in degree centigrade.

EXAMPLE 1

0.76 part of sodium nitrate is sprinkled at 0 to 10° C. into 9 parts of concentrated sulphuric acid. The mixture is heated at 65° C. until all has dissolved, then cooled to 0° C. and 10 parts by volume of a mixture of glacial acetic acid and propionic acid 4:1 are dropped in. A solution of 1.36 parts of 5-amino-3-chloro-1,2,4-thiadiazole in 15 parts by volume of 4:1-mixture of glacial acetic acid and propionic acid is added to the resulting solution and the whole is stirred for 3 hours at 0 to 5° C. 0.75 part of urea is added portionwise to this diazo solution. The resulting diazo solution is added at 0 to 5° C. to a solution of 2.43 parts of N-cyanoethyl-N-cyanoethoxyethyl-aniline in 30 parts of alcohol. The mixture is stirred for about 2 hours and then rendered neutral to Congo red with sodium acetate solution. On completion of the coupling the acetic and propionic acids are neutralised with sodium hydroxide solution. The precipitated dyestuff is filtered off and washed with water. It corresponds to the formula

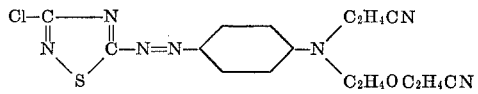

and dyes polyester fibres red shades having excellent fastness properties.

In an analogous manner dyestuffs are obtained when a diazonium compound of 3-chloro-5-aminothiadiazole is coupled with the coupling components listed in Column I of the following table. These dyestuffs dye polyester fibres the shades listed in Column II.

| No. | I | II |
|---|---|---|
| 1 | N-ethyl-N-β-cyanoethylaniline | Red. |
| 2 | N,N-di-β-cyanoethyl-m-toluidine | Red. |
| 3 | N,N-di-β-hydroxyethyl-m-chloraniline | Blue-red. |
| 4 | N-ethyl-N-β-phthalimidoethyl-m-toluidine | Do. |
| 5 | N-β-benzoyloxyethyl-N-β-cyanoethylaniline | Red. |

| No. | I | II |
|---|---|---|
| 6 | N,N-di-β-acetoxyethyl-3-acetamidoaniline | Red-violet. |
| 7 | N-β-cyanoethyl-N-β-(2'-methyl-5'-pyridyl)-ethyl-m-anisidine. | Blue-red. |
| 8 | Diphenylamine | Red. |
| 9 | N-β-cyanoethoxyethyl-2-methoxy-5-propionyl-amino-aniline. | Violet. |
| 10 | 3-ethanesulphonamidoaniline | Red. |
| 11 | N-benzyl-N-β-cyanoethylaniline | Yellow-red. |
| 12 | N-acetylmethyl-N-β-phenoxyethylaniline | Do. |
| 13 | N-β-cyanoethyl-N-β-phenylcarbonylethyl-m-toluidine. | Red. |
| 14 | N-ethyl-N-β-phenoxycarbonylethylaniline | Red. |
| 15 | N-β-cyanoethyl-N-β-phenacetylaniline | Red. |
| 16 | N-β-phenylaminocarbonylethyl-N-ethyl-m-toluidine. | Blue-red. |
| 17 | N-(γ-3'-methylbenzoyloxy)propyl-N-β-cyanoethyl-3-bromaniline. | Do. |
| 18 | N-n-butyl-N-β-cyanoethyl-3-methansulphonamidoaniline. | Violet. |
| 19 | N-benzyl-N-(β-4'-methoxycarbonylbenzoyloxy)ethylaniline. | Blue-red. |
| 20 | N-β-hydroxyethyl-N-β-cyanoethyl-3-phenoxycarbonyl-amino-aniline. | Violet. |
| 21 | 3-acetylaminodiphenylamine | Do. |
| 22 | N-β-cyanoethyl-N-β-n-butylaminocarbonyloxyethylaniline. | Red. |
| 23 | N-β-ethoxycarbonylethyl-N-β-phenoxycarbonyloxy-ethylaniline. | Red. |
| 24 | N-β-cyanethyl-N-β-methoxyethyl-3-benzoylaminoaniline. | Red-violet. |
| 25 | N-β-chloroethyl-N-β-cyanoethyl-3-ethylaniline | Blue-red. |
| 26 | N-β-cyanoethyl-2-chloraniline | Yellow-red. |
| 27 | N-β-phenylsulphonylethyl-N-ethylaniline | Blue-red. |
| 28 | N-β-anisoyloxyethyl-N-β-cyanoethyl-3-chloraniline. | Do. |
| 29 | N-β-(2'-chlorobenzoyl)oxyethyl-N-cyano-methylaniline. | Yellow-red. |
| 30 | N-β.aminocarbonyl-N-n-butyl-m-toluidine | Ruby. |
| 31 | N-β-cyanoethyl-N-β-phenylamino-carbonyl-oxypropylaniline. | Red. |
| 32 | N-β-phenylsulphonylaminoethyl-N-propyl-aniline. | Blue-red. |
| 33 | 3-N-β-cyanoethylaminodiphenylether | Yellow-red. |
| 34 | 3-N-β-cyanoethylaminodiphenylsulphide | Red. |
| 35 | N-β-phenoxyacetoxyethyl-N-β-cyanoethyl-aniline. | Red. |
| 36 | N-β-Phenylthioethyl-N-β-ethoxycarbonyloxy-ethyl-3-ethylaniline. | Blue-red. |
| 37 | N-β-γ-dihydroxypropyldiphenylamine | Do. |
| 38 | N-β-phenyl-β-hydroxyethyl-N-ethylaniline | Do. |
| 39 | N-β-propionyloxyethyl-N-β-cyanoethyl-2-ethoxy-5-ethoxycarbonylaminoaniline. | Violet. |
| 40 | N-β-acetylaminoethyl-N-isopropylaniline | Ruby. |
| 41 | -γ-nicotinyloxypropyl-N-β-cyanoethyl-3-trifluoro-methylaniline. | Red. |
| 42 | N-β-cyanoethyl-N-β-(2'-thiophencarbonyl)-oxyethylaniline. | Red. |
| 43 | N-β-cyanoethyl-N-β-(2'-cyanopropionyl)-oxyethyl-3-bromaniline. | Red. |
| 44 | N-β-cyanoethyl-N-β-methoxyacetoxyethyl-3-(N'-methyl-N'-acetyl)aminoaniline. | Red-violet. |
| 45 | N-β-phenylacetoxyethyl-N-β-cyanoethylaniline | Red. |
| 46 | N-β-2'-furoyloxyethyl-N-β-methoxycarbonylethyl-3-ethoxyaniline. | Ruby. |
| 47 | 3-N-β-cyanoethylaminodiphenyl | Red. |
| 48 | 3-N-β-cyanoethylaminodiphenylmethane | Red. |
| 49 | N-β-acetoxyethyltetrahydroquinoline | Ruby. |
| 50 | N-β-hydroxyethyl-1-naphthylamine | Violet. |
| 51 | 2-naphthylamine-6-sulphon-γ-methoxypropyl-amide. | Blue-Red. |
| 52 | 1-(2',5'-dichlorophenyl)-3-methyl-5-pyrazolone | Yellow. |
| 53 | 1-phenyl-3-ethoxycarbonyl-5-pyrazolone | Do. |
| 54 | 1-β-(β'-methoxycarbonyl)propionyloxyethyl-3-methyl-5-pyrazolone. | Do. |
| 55 | 1-β-hydroxyethyl-3-methyl-5-aminopyrazole | Red-yellow. |
| 56 | 1-(4'-methylphenyl)-3-methyl-5-aminopyrazole | Do. |
| 57 | 1-phenyl-3-methylaminopyrazole | Do. |
| 58 | 1-phenyl-3-methoxy-5-aminopyrazole | Do. |
| 59 | 2-methylindole | Orange. |
| 60 | 1.2-dimethylindole | Do. |
| 61 | 2,4-dimethyl-7-methoxyindole | Do. |
| 62 | 2-methyl-5-chlorindole | Do. |
| 63 | 2-phenylindole | Do. |
| 64 | 2-phenyl-5-methoxyindole | Do. |
| 65 | Carbonic acid-di-(β-N-β'-cyanoethyl-N-phenylamino)-ethylester. | Red. |
| 66 | Adipic acid-di-(β-N-β'-cyanoethyl-N-(phenylamine)-ethylester. | Red. |
| 67 | Di-(β-N-β'-cyanoethyl-N-phenylamino)ethyl-ether. | Red. |
| 68 | Hexamethylenedicarbamic acid-di-(β-N-β'-cyanoethyl-N-m-toluylaminoethyl)ester. | Red. |
| 69 | Thiophene-2,5-dicarboxylic acid-di-(β-N,N-bisacetoxy-ethylamino)anilide. | Red-violet. |

Dyeing example 1 part of the dyestuff obtained above is ground in the wet state with 2 parts of an aqueous solution of 50% strength of the sodium salt of dinaphthylmethanedisulphonic acid.

This dyestuff preparation is stirred with 40 parts of an aqueous solution of 10% strength of the sodium salt of N-benzyl-μ-heptadecyl-benzimidazoledisulphonic acid, and then 4 parts of a solution of 40% strength of acetic acid are added. This mixture is diluted with water to obtain a dyebath of 4000 parts.

100 parts of a cleaned polyester fibre material are immersed in this bath at 50° C., the temperature is raised to 120–130° C. within half an hour and dyeing is performed for 1 hour under superatmospheric pressure at this temperature. The material is then thoroughly rinsed. A strong, pure red dyeing is obtained.

EXAMPLE 2

4.07 parts of 5-amino-3-chloro-1,2,4-thiadiazole are diazotised as described in Example 1. The diazo solution is run at 0° C. into a solution of 3.21 parts of m-toluidine in 50 parts by volume of methanol. The coupling mixture is rendered neutral to Congo red with sodium acetate solution. On completion of the coupling the acetic and propionic acids are neutralised with sodium hydroxide solution. The precipitated 3-methyl-4-(3'-chloro-1,2,4-thiadiazole-5'-azo) aniline is filtered offff, washed with water and dried.

5.07 parts of the product obtained as described above are dissolved in 25 parts by volume of phosphoric acid, 1.5 parts of sodium nitrite are added at 0° C. and the whole is stirred for 2 hours at 0° C. Then 1.5 parts of urea are added and the batch is stirred for another 15 minutes. The resulting diazo solution is run at 0° C. into a solution of 1.9 parts of phenol in 10 parts of alcohol, and at the same time 15% sodium hydroxide solution is added so that the pH value of the coupling mixture remains between 7 and 8. The mixture is stirred for 4 hours at 0° C., then diluted with cold water, and the precipitated dyestuff is filtered off and washed free from salt. The resulting dyestuff of the formula

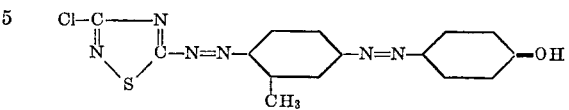

dyes polyester materials red shades having good fastness properties.

In an analogous manner diazo dyestuffs are obtained when a diazonium compound of 3-chloro-5-amino-thiadiazole is first coupled with the coupling components of the aniline series listed in column I of the following table and then once more diazotised and coupled with the coupling components shown in column II. The dyestuffs dye polyester fibres the shades shown in column III.

| No. | I | II | III |
|---|---|---|---|
| 1 | 3-anisidine | 2-methylphenol | Brown-red. |
| 2 | 3-chloraniline | 4-methylphenol | Do. |
| 3 | 3-toluidine | 3-methylpyrazolone | Red. |
| 4 | 2-methoxy-5-methylaniline. | 1-phenyl-3-methylpyrazolone. | Red. |
| 5 | 3-toluidine | N-ethyl-N-β-cyanoethyl-aniline. | Blue-red. |

EXAMPLE 3

1.36 parts of 5-amino-3-chloro-1,2,4-thiadiazole are diazotised as described in Example 1. The diazo solution is added to a solution of 2.63 parts of 2'-(N'-ethylanilino)-N-ethyl-pyridinium chloride in 50 parts of water at 0 to 5° C. The mixture is stirred for about 1 hour and rendered neutral to Congo red with sodium acetate solution. On completion of the coupling the reaction mixture is evaporated in a rotary evaporator. The residue is dissolved in water with heating and clarified by filtration. The filtrate is salted out. The precipitated dyestuff, is filtered off, washed with a sodium chloride solution of 10% strength and dried. The resulting dyestuff of the formula

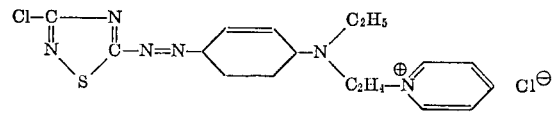

dyes polyacrylonitrile fibres red shades having excellent fastness properties.

In an analogous manner dyestuffs are obtained, which dye acrylic fibres the shades shown in column II of the following table, when diazotised 3-chloro-5-amino-thiadiazole is coupled with the coupling components listed in column I.

| No. | I | II |
|---|---|---|
| 1 | [structure with C₂H₅, CH₃, C₂H₄N⁺-pyridine, Cl⁻] | Blue-red. |
| 2 | [structure with OCH₃, CH₃, CH₃, C₃H₆N⁺-pyridine, C₇H₇SO₃⁻] | Claret. |
| 3 | [structure with H, NHCOCH₃, C₂H₄N⁺-pyridine] | Do. |
| 4 | [structure with C₂H₅, Cl, C₂H₄N⁺(CH₃)₃, Br⁻] | Blue-red. |
| 5 | [structure with C₂H₄OCH₃, C₂H₄N⁺(C₂H₅)₂H, CH₃CO₂⁻] | Red. |
| 6 | [structure with C₂H₅, CH₃, C₂H₄NH₃⁺, Cl⁻] | Blue-red. |
| 7 | [structure with CH₂-phenyl, C₂H₄N⁺(H)(CH₃), CH₃SO₄⁻] | Red. |
| 8 | [structure with C₃H₇, C₂H₄N⁺(CH₃)₂NH₂, CH₃SO₃⁻] | Red. |
| 9 | [structure with CH₃, C₃H₆N⁺(C₂H₅)₂, OC₂H₅, CH₃SO₃⁻] | Red. |
| 10 | [structure with C₂H₄CN, C₂H₄-pyridinium-CH₃, CH₃SO₄⁻] | Red. |
| 11 | [structure with C₂H₄CN, C₂H₄OCO-pyridinium-CH₃, CH₃SO₄⁻] | Red. |
| 12 | [structure with C₂H₄CN, C₂H₄OCOCH₂N⁺(CH₃)₃, Cl⁻] | Red. |
| 13 | [structure with H, C₂H₄N⁺-pyridine, C₇H₇SO₃⁻] | Blue-red. |
| 14 | [pyrazolone structure with NHCOCH₂N⁺-pyridine, Cl⁻] | Yellow. |
| 15 | [pyrazolone structure with CH₂CH₂-pyridinium-CH₃, I⁻] | Do. |
| 16 | [aminopyrazole structure with SO₂NHC₃H₆N⁺(CH₃)₃, CH₃SO₄⁻] | Red-yellow. |
| 17 | [aminopyrazole structure with C₂H₄N⁺-pyridine, CH₃SO₃⁻] | Do. |
| 18 | [indoline structure with C₂H₄N⁺-pyridine, CH₃SO₃⁻] | Orange. |
| 19 | [naphthalene with NH₂, SO₂NHC₃H₆N⁺(CH₃)₃, CH₃SO₄⁻] | Red. |
| 20 | [pyridone with CH₃, CN, HO, C₂H₄N⁺(CH₃)₂H, ½SO₄⁻] | Yellow. |

Dyeing example

A mixture of 1 part of the dyestuff obtained in Example 3 and 2 parts of acetic acid of 40% strength is dissolved in 5000 parts of water. 100 parts of dried yarn of polyacrylonitrile staple fibres are immersed in this dyebath at 60° C., the temperature is raised to 100° C. within half an hour and the yarn is dyed for 1 hour at the boil. The dyed yarn is then thoroughly rinsed and dried. The resulting red dyeing has very good fastness to light, sublimation and washing.

EXAMPLE 4

4.07 parts of 5-amino-3-chloro-1,2,4-thiadiazole are diazotised as described in Example 1. The diazo solution is added to a solution of 3.63 parts of N,N-dimethylaniline in 50 parts by volume of methanol at 0° C. The coupling mixture is stirred for ½ hour and rendered neutral to Congo red with sodium acetate solution. On completion of the coupling the precipitated dyestuff is filtered off, washed free from salt and dried.

2.7 parts of the dyestuff obtained above are dissolved in 40 parts of warm chlorobenzene. A solution of 1.5 parts of dimethylsulphate in 5 parts of chlorobenzene is dropped in and the mixture is stirred for 3 hours at 90 to 95° C. The reaction mixture is cooled and filtered. The filter cake is dissolved in hot water and clarified by filtration. The dyestuff is precipitated with sodium chloride and zinc chloride. The precipitated dyestuff has the formula

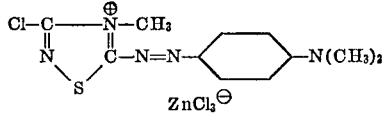

and is filtered off and dried. It dyes polyacrylonitrile fibres violet shades having very good fastness properties.

In an analogous manner quaternated dyestuffs containing thiadiazolinium groups are obtained, which dye acrylic fibres the shades shown in column III of the following table, when diazotised 3 - chloro - 5 - aminothiazole is coupled with the coupling components listed in column I and the dyestuff thus formed is then quaternated with the alkylating agent shown in column II.

| No. | I | II | III |
|---|---|---|---|
| 1 | Aniline | Dimethylsulphate | Blue-red. |
| 2 | 2-methylaniline | p-Toluenesulphonic acid methyl ester. | Do. |
| 3 | 3-methyl-6-methoxy | p-Toluenesulphonic acid methyl ester. | Do. |
| 4 | 3-acetaminoaniline | Diethyl sulphate | Do. |
| 5 | 3-chloro-N, N-diethyl-aniline. | do | Violet. |
| 6 | N-methyl-N-hydroxy-ethylaniline. | do | Do. |
| 7 | N,N-dihydroxyethyl-aniline. | Benzyl bromide | Do. |
| 8 | N-phenylmorpholine | Ethyl bromide | Do. |
| 9 | 3-Br-N-methyl-N-methoxyethylaniline. | Ethyl iodide | Do. |
| 10 | N-ethyl-N-cyanethyl-aniline. | do | Do. |
| 11 | N-butyl-N-chloro-ethylaniline. | Methyl iodide | Do. |
| 12 | Diphenylamine | do | Do. |
| 13 | Tetrahydroquinoline | p-Toluenesulphonic acid butyl ester. | Do. |
| 14 | N,N-dimethyl-1-naphthylamine. | do | Do. |
| 15 | 2-naphthylamine | Benzenesulphonic acid methoxyethylester. | Red-brown. |
| 16 | 2-methylindole | Dimethylsulphate | Orange-red. |
| 17 | 1,2-dimethylindole | do | Do. |
| 18 | 2,4-dimethyl-7-methoxyindole. | do | Do. |
| 19 | 2-phenyl-5-chlorindole | do | Do. |
| 20 | 1-phenyl-3-methyl-5-amino-pyrazole. | do | Yellow-brown. |
| 21 | Adipic acid-bis-(N-phenyl-N-ethyl-β-amino-ethanol)-ester. | Methyl iodide | Violet. |
| 22 | Di-(N-phenyl-N-ethyl-β-amino)-ethylether. | do | Do. |
| 23 | N,N-dimethylaniline | Diethyl sulphate | Do. |

In an analogous manner 3-methyl-4-(3'-chloro-1',2',4'-thiadiazole-5'-azo)-aniline as diazo component and N,N-dimethylaniline as coupling component, followed by methylation with dimethyl sulphate, furnishes the dyestuff of the formula

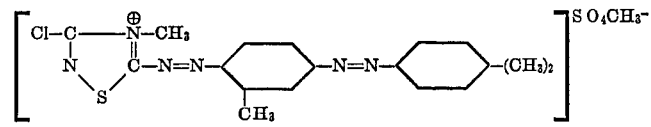

EXAMPLE 5

4.07 parts of 5-amino-3-chloro-1,2,4-thiadiazole are diazotised as described in Example 1. The diazo solution is run at 0° C. into a solution of 9.78 parts of 2-[N-methyl-N-β-N'-ethyl -N' - phenylaminoethyl]-amino-4,6-dichlorotriazine in 100 parts of acetone. The coupling mixture is rendered neutral to Congo red with sodium acetate solution. On completion of the coupling the mixture is diluted with water. The precipitated dyestuff is filtered off, washed with water and dried. The dyestuff of the formula

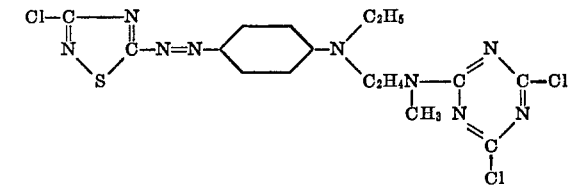

after heat fixation or alkaline fixation dyes polyamide fibres red-violet shades having very good wet fastness properties.

In an analogous manner fibre-reactive dyestuffs are obtained when a diazonium compound of 3-chloro-5-amino-thiadiazole is coupled with the coupling components listed in column I of the following table. The dyestuffs dye nylon fibres the shades shown in column II.

| No. | I | II |
|---|---|---|
| | | Shade on synthetic polyamide |
| 1 | N-ethyl-N-β-chloroacetoxyethylaniline | Red-violet. |
| 2 | N-ethyl-N-β-chloroacetamino-m-toluidine | Do. |
| 3 | 3-α,β-dibromopropionylamino-N,N-diacetoxyethyl-aniline. | Violet. |
| 4 | 2-[N-methyl-N-(β-N'-ethyl-N'-phenylamino-ethyl)]-amino-4-anilino-6-chlorotriazine. | Red-violet. |
| 5 | 2-[N-methyl-N-(β-N'-ethyl-N'-phenylamino-ethyl)]-amino-4-methoxy-6-chlorotriazine. | Do. |
| 6 | 6-[N-methyl-N-(β-N'-ethyl-N'-phenylamino-ethyl)]-amino-2,4-5-trichloropyrimidine. | Do. |
| 7 | 2,3-dichloroquinoxaline-6-carboxylic acid-[N-(β-N'-ethyl-N',m-toluylaminoethyl)]-amide. | Do. |
| 8 | 2-[N-methyl-N-(β-N'-methyl-N'-phenylamino-ethyl)]-4,6-difluorotriazine. | Do. |

Dyeing example 10 parts of a nylon-6,6 knitted fabric ("Helanca") are immersed at 30° C. in a dyebath which contains in 400 parts by volume of water 0.2 part of acetic acid of 80% strength and 2 parts of a 5% aqueous dispersion of the compound obtained as described in Example 5, and has a pH value from 4 to 5. During 45 minutes the whole is heated to the boil and dyeing is performed for 30 minutes at the boil. By adding sodium carbonate the pH value is then adjusted to 12 and boiling is continued for 30 minutes. The textile material is then thoroughly rinsed with water and dried. The resulting brilliant violet-red dyeing contains a considerable portion of dyestuff that cannot be extracted.

The dispersions mentioned above are obtained by grinding a mixture of 20 parts of dyestuff, 140 parts of water and 40 parts of sodium dinaphthylmethane-disulphonate.

EXAMPLE 6

1.36 parts of 5-amino-3-chloro-1,2,4-thiadiazole are diazotised as described in Example 1. The diazo solution is run at 0° C. into a solution of 1.44 parts of β-naphthol in 50 parts by volume of alcohol, while at the same time adding sodium hydroxide solution of 15% strength at such a rate that the pH value of the coupling mixture remains at from 7 to 8. The mixture is stirred for 4 hours at 0° C., then diluted with cold water, and the precipitated dyestuff is filtered off and washed free from salt; it corresponds to the formula

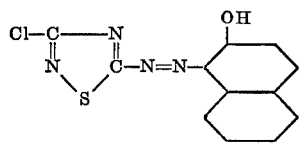

which dyes nickel-modified polypropylene materials red-violet shades having good fastness properties.

Dyestuffs that dye polypropylene the shades shown in column II of the following table are obtained in an analogous manner when a diazonium compound of 3-chloro-5-amino-thiadiazole is coupled with the coupling components shown in column I.

| No. | I | II |
|---|---|---|
| 1 | 4-methylphenol | Blue. |
| 2 | 4-isopropylphenol | Do. |
| 3 | 4-cyclohexylphenol | Do. |
| 4 | 4-chlorophenol | Do. |
| 5 | 4-methoxyphenol | Do. |
| 6 | 2,4-dimethylphenol | Do. |
| 7 | Acetylacetone | Yellow. |
| 8 | Dimedone | Do. |
| 9 | 1,3-dimethylbarbituric acid | Do. |
| 10 | 3-dimethylaminophenol | Blue-red. |
| 11 | 3-diethylaminophenol | Do. |
| 12 | 3-ethylaminophenol | Red. |
| 13 | 3-hydroxydiphenylamine | Violet. |
| 14 | 3-hydroxy-4'-methyldiphenylamine | Do. |
| 15 | 1-phenyl-3-methyl-5-pyrazolone | Yellow-orange. |
| 16 | 1-(4'-chlorophenyl)-3-methyl-5-pyrazolone | Do. |
| 17 | 3-methyl-5-pyrazolone | Do. |
| 18 | 1-butyl-3-methyl-5-pyrazolone | Do. |
| 19 | 1-methyl-4-hydroxy-2-quinolone | Yellow. |
| 20 | 1-butyl-4-hydroxy-2-quinolone | Do. |
| 21 | 4-hydroxycumarine | Do. |
| 22 | 1,2-diphenylpyrazolidine-3,5-dione | Do. |
| 23 | 4,5-diphenylimidazole | Blue. |
| 24 | 1,3-indandione | Yellow. |
| 25 | Indoxyl | Red-yellow. |
| 26 | Acetoacetic acid anilide | Green-yellow. |
| 27 | 8-hydroxyquinoline | Claret. |
| 28 | Malonic acid dinitrile | Yellow. |
| 29 | 5,6,7,8-tetrahydro-2-naphthol | Violet. |
| 30 | 5-chloro-1-naphthol | Do. |
| 31 | 4-ethoxy-1-naphthol | Do. |
| 32 | 2-hydroxy-3-naphthoic acid butylamide | Do. |
| 33 | 5-hydroxyacenaphthene | Do. |
| 34 | 2-phenylaminonaphthalene | Blue. |

Printing example 1 part of the dyestuff of Example 6 together with 1 part of 1,1'-dinaphthylmethane-2,2'-disulphonic acid is ground in a ball mill to a fine aqueous paste containing 10% of dyestuff. Then, a mixture of 100 parts of this paste
310 parts of cold water
50 parts of urea
500 parts of a 5% aqueous sodium alginate solution
40 parts of ammonium sulphate

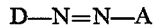

1000 parts is prepared in a high-speed stirrer, and a nickel-containing polypropylene fabric is printed with the printing paste obtained in this manner. The printed fabric is dried, steamed for 30 minutes, rinsed in cold water, soaped for 20 minutes at 60° C. with a solution containing per litre of water 1 to 2 g. of the condensation product of 9 mols of ethylene oxide with 1 mol of nonylphenol, and then rinsed in cold water. The red-violet print thus obtained has very good fastness properties.

I claim:
1. An azo dyestuff of the formula

D—N=N—A wherein D is 3-chloro-1,2,4-thiadiazolyl-5 or 3-chloro-1,2,4-thiadiazolium-5 and where A is the radical of a coupling component bound to the azo group via a carbon atom and selected from the group consisting of hydroxybenzene, hydroxybenzene substituted by lower alkyl-, lower alkoxy-, chloro-, lower alkylamino-, lower dialkylamino- or alkanoylamino containing up to 8 carbon atoms, hydroxynaphthalene, aminonaphthalene, indole or indole substituted by lower alkyl-, lower alkoxy-, chloro-, cyano-, nitro- or phenyl-, 5-hydroxypyrazolone, 5-aminopyrazolone or 5-aminopyrazolone substituted by lower alkyl-, phenyl-, carboxy-, carbonamido- or carbloweralkoxy, 4-hydroxyquinoline-2, or 4-hydroxyquinoline-2 substituted by lower alkyl-, lower alkoxy- or chloro-, tetrahydroquinoline or tetrahydroquinoline substituted by lower alkyl-, lower alkoxy-, lower cyanalkyl- or lower alkanoyloxy, malonic dinitrile, 2-hydroxy-4-methyl-5-cyano-6-pyridone, acetyl-acetone, dimedone, the term lower meaning that the radical contains at most 4 carbon atoms.

2. A dyestuff according to claim 1 in which A is a coupling component selected from cresol, resorcinol, 1-hydroxy-3-cyanomethylbenzene, aminobenzene having the formula

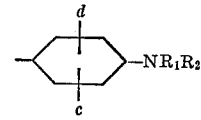

in which $d$ is hydrogen, chlorine, bromine, lower alkyl, lower alkoxy, $C_1$–$C_2$-alkylmercapto, phenyl, phenylmercapto, phenoxy, cyclohexyl or benzyl; $c$ is hydrogen, chlorine, bromine, lower alkyl, lower alkoxy, $C_1$–$C_2$-alkylmercapto, phenyl, phenylmercapto, phenoxy, cyclohexyl, benzyl, trifluoromethyl, $S_1$–$C_2$-alkyl sulphonamido or $C_1$–$_8$-alkanoylamino, $C_1$–$C_2$-alkylsulphonic acid, p-toluene sulphonic acid, phenoxycarbonyl, $C_1$–$C_2$-alkoxycarbonyl, ethoxycarbonylamino or aminocarbonyl; $R_1$ and $R_2$ each independently is hydrogen, lower alkyl or lower alkyl substituted by benzyl, phenyl, chloro, cyano, ($C_1$–$C_2$) alkoxy, glycidyl, hydroxy, nitro, carb(lower)alkoxy, formylamino, acetylamino, (lower)alkylcarbonyloxy, β-phenylsulphonyl, β-toluenesulphonyl, β-p-chlorobenzenesulphonyl, β-methylcarbamyloxy, β-phenylcarbamyloxy, (lower)alkyloxycarbonyloxy, acetamidopropyl, nitrophenoxy, hydroxyphenoxy, (acetyl, cyano, hydroxy, methoxy or acetoxy)ethoxycarbonyl, cyanoethoxy, carboxy, acetyl, amino, diethylamino, β-cyanoacetoxy, β-benzoyl-β-hydroxy, benzoyloxy, phthaloylimido, 2-methyl - 5 - pyridyl, phenoxy, 4 - methoxycarbonylbenzoyloxy, anisoyloxy, 2 - chlorobenzoyloxy, phenylsulphonyloxy, phenoxyacetoxy, phenythio, nicotinyloxy, 2 - thiophenecarbonyl, methoxyacetoxy, phenylacetoxy or furoyloxy; diphenylamine, N-phenylmorpholine, naphthol, 1-naphthylamine 2-naphthylamine, 2-phenylaminonaphthaline, 1-dimethylaminonaphthalene, 2 - ethylaminonaphthalene, indole, substituted by methyl, phenyl, cyano, cyanoethyl, methoxy, ethoxy, halogeno and nitro; 1-phenyl-5-aminopyrazole, 3-methylpyrazolone(5) or 3-methylpyrazolone (5) substituted in the 1-position by methyl, butyl, phenyl, chlorophenyl, hydroxyethyl or cyanoethyl; 8-hydroxyquinoline, 1-methyl-4-hydroxyquinolone-(2), N-β-cyanoethyl-1,2,3,4-tetrahydroquinoline, barbituric acid, 1,3-indandione, 1,8-naphthindadione, dimedone, acetylacetone and 5-hydroxybenzthiazole.

3. A dyestuff of the formula

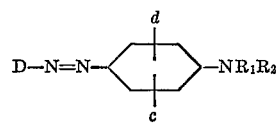

in which

D is 3-chloro-1,2,4-thiadiazolyl-5 or 3-chloro-1,2,4-thiadiazolium-5

$d$ is hydrogen, chlorine, bromine, lower alkyl, lower alkoxy, $C_1$–$C_2$ alkylmercapto, phenyl, phenylmercapto, phenoxy, cyclohexyl or benzyl $c$ is hydrogen, chlorine, bromine, lower alkyl, lower alkoxy, $C_1$–$C_2$ alkylmercapto, phenyl, phenylmercapto, phenoxy, cyclohexyl, benzyl, trifluoromethyl, $C_1$–$C_2$ alkyl sulphonamido or acyl $C_1$–$_8$-alkanoylamino $C_1$–$C_2$ alkyl sulphonic acid, p-toluene sulphonic acid, phenoxycarbonyl, $C_1$–$C_2$ alkoxycarbonyl ethoxycarbonylamino or aminocarbonyl, $R_1$ and $R_2$ each independently is hydrogen, lower alkyl or lower alkyl substituted by benzyl, phenyl, chloro, cyano, ($C_1$–$C_2$)alkoxy, glycidyl, hydroxy, nitro,carb(lower)alkoxy, formylamino, acetylamino, (lower) alkylcarbonyloxy, β-phenylsulphonyl, β-toluenesulphonyl, β-p-chlorobenzenesulphonyl, β - methylcarbamyloxy, β-phenylcarbamyloxy, (lower)alkyloxycarbonyloxy, acetamidopropyl, nitrophenoxy, hydroxyphenoxy, (acetyl, cyano, hydroxy, methoxy or acetoxy) ethoxycarbonyl, cyanoethoxy, carboxy, acetyl, amino, diethylamino, β-cyanoacetoxy, β-benzoyl-β-hydroxy, benzoyloxy, phthaloylimido, 2-methyl-5-pyridyl, phenoxy, 4-methoxycarbonylbenzoyloxy, anisoyloxy, 2-chlorobenzoyloxy, phenylsulphonyloxy, phenoxyacetoxy, phenythio, nicotinyloxy, 2-thiophenecarbonyl, methoxyacetoxy, phenylacetoxy or furoyloxy.

4. An azo dyestuff as claimed in claim 3, wherein either c or d stands for acylamino the acyl of which is selected from chloroacetyl and α,β-dibromopropionyl or $R_1$ contains a group of the formula —$C_1$–$C_3$—alkylene-$c'$, wherein $c'$ is chloroacetylamino, α,β-dibromopropionylamino, chlorotriazinylamino or chloropyrimidinylamino.

5. A dyestuff of the formula

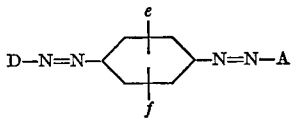

where D is 3-chloro-1,2,4-thiadiazolyl-5 or 3-chloro-1,2,4-thiadiazolium-5; e is H, $CH_3$, $OCH_3$ or Cl; f is H or $OCH_3$; A is hydroxybenzene, hydroxybenzene substituted by lower alkyl, lower alkoxy, chloro, lower alkylamino, lower dialkylamino or $C_{1-8}$-alkanoylamino; 5-hydroxypyrazole 5-aminopyrazole or said 5-hydroxypyrazole and 5-aminopyrazole substituted by lower alkyl, phenyl, carboxy, carbonamido or carbloweralkoxy; or aminobenzene of the formula

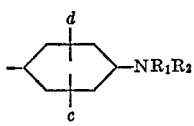

in which d is hydrogen, chlorine, bromine, lower alkyl, lower alkoxy, $C_1$–$C_2$-alkylmercapto, phenyl, phenylmercapto, phenyl, phenylmercapto, phenoxy, cyclohexyl or benzyl; c is hydrogen, chlorine, bromine, lower alkyl, lower alkoxy, $C_1$–$C_2$-alkylmercapto, phenyl, phenylmercapto, phenoxy, cyclohexyl, benzyl, trifluoromethyl, $C_1$–$C_2$-alkyl sulphonamido or $C_{1-8}$-alkanoylamino, phenoxy carbonylamino, $C_1$–$C_2$-alkoxycarbonylamino or alkylamino carbonylamino; $R_1$ and $R_2$ each independently is hydrogen, lower alkyl or lower alkyl substituted by phenyl, chloro, cyano, ($C_1$–$C_2$)alkoxy, glycidyl, hydroxy, nitro, carb(lower)alkoxy, formylamino, acetylamino, (lower)alkylcarbonyloxy, β-phenylsulphonyl, β-toluenesulphonyl, β-p-chlorobenzenesulphonyl, β-methylcarbamyloxy, (lower)alkyloxycarbonyloxy, acetamidopropyl, nitrophenoxy, hydroxyphenoxy, (acetyl, cyano, hydroxy, methoxy or acetoxy)ethoxycarbonyl, cyanoethoxy, carboxy, acetyl, amino, diethylamino, β-cyanoacetoxy, β-benzoyl-β-hydroxy, benzoyloxy, phthaloylimido, 2-methyl-5-pyridyl, phenoxy, 4-methoxy-carbonylbenzoyloxy, anisoyloxy, 2-chlorobenzoyloxy, phenylsulphonyloxy, phenoxyacetoxy, phenylthio, nicotinyloxy, 2-thiophenecarbonyl, methoxyacetoxy, phenylacetoxy or furoyloxy.

6. A dyestuff according to claim 4 where A is an aminobenzene of the formula

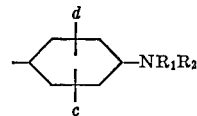

3-methyl-5-hydroxypyrazole or 3-methyl - 5 - hydroxypyrazolone substituted in the 1-position by lower alkyl, phenyl, chlorophenyl, hydroxyethyl or cyanoethyl.

7. A dyestuff of the formula

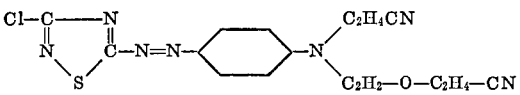

8. A dyestuff of the formula

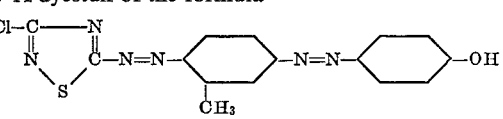

9. A dyestuff of the formula

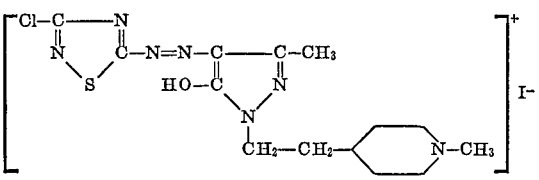

10. A dyestuff of the formula

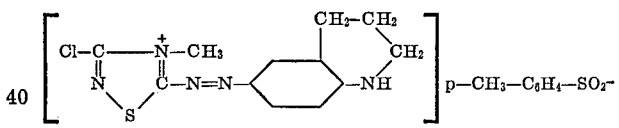

11. A dyestuff of the formula

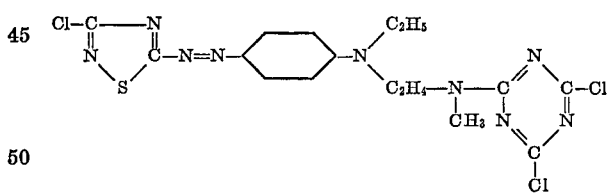

References Cited
UNITED STATES PATENTS

| | | | |
|---|---|---|---|
| 2,659,719 | 11/1953 | Dickey et al. | 260—155 XR |
| 2,891,942 | 6/1959 | Merian | 260—157 XR |
| 3,221,006 | 11/1965 | Moore et al. | 260—158 |
| 3,321,266 | 5/1967 | Wunderlich et al. | 260—158 XR |
| 3,392,164 | 7/1968 | Wunderlich | 260—158 |
| 3,483,180 | 12/1969 | Ramanathan | 260—158 |
| 3,534,016 | 10/1970 | Lange | 260—207 |
| 3,398,134 | 8/1968 | Ball et al. | 260—157 |
| 3,415,809 | 12/1968 | Fisher et al. | 260—158 |
| 3,428,621 | 2/1969 | Wallace et al. | 260—158 |
| 3,453,256 | 7/1969 | Dale et al. | 260—158 |

FLOYD DALE HIGEL, Primary Examiner

U.S. Cl. X.R.

8—41 B, 41 D, 71; 260—146 R, 154, 155, 156, 157, 158, 332.2 C, 463, 465 D, 465 E, 472, 475 R, 482 B, 485 J, 570.5 R

UNITED STATES PATENT OFFICE
CERTIFICATE OF CORRECTION

Patent No. 3,732,201     Dated May 8, 1973

Inventor(s) VISVINATHAN RAMANATHAN

It is certified that error appears in the above-identified patent and that said Letters Patent are hereby corrected as shown below:

Column 18, line 26, delete "$S_1$" and insert -- $C_1$ --;

line 75, delete "acyl"

Signed and sealed this 9th day of July 1974.

(SEAL)
Attest:

McCOY M. GIBSON, JR.
Attesting Officer

C. MARSHALL DANN
Commissioner of Patents